June 20, 1933.  E. B. BOUGHTON  1,914,844

BRAKING MEANS

Filed Feb. 7, 1929

INVENTOR
E. B. BOUGHTON
BY Jno Imirie
ATTY.

Patented June 20, 1933

1,914,844

UNITED STATES PATENT OFFICE

EDWARD BISHOP BOUGHTON, OF LONDON, ENGLAND

BRAKING MEANS

Application filed February 7, 1929, Serial No. 338,296, and in Great Britain February 9, 1928.

This invention relates to brakes for use on the running wheels of vehicles, and has for its object to provide an improved construction which shall avoid troubles due to uneven wear or distortion of the brake drums which often arise in connection with known types of brakes, more particularly those in which internal expanding shoes are employed and especially in the case of the brakes of heavy commercial road vehicles.

To this end and in accordance with the present invention a brake such as those for use on the wheels of vehicles comprises a brake drum and a plurality of brake elements, such as pairs of internal expanding shoes, which are mounted independently side by side and connected individually with a common control in such manner that when the brake is brought into action said elements may adapt themselves accurately to, and distribute the braking pressure uniformly over the active surface of the brake drum despite any wear or distortion of the latter.

Preferably, the brake elements are operated by means of an hydraulic or other fluid-pressure system, there being provided for each a separate hydraulic cylinder or equivalent, whilst the whole of said cylinders are connected hydraulically or in an equivalent manner with a common source of pressure.

Figure 1:
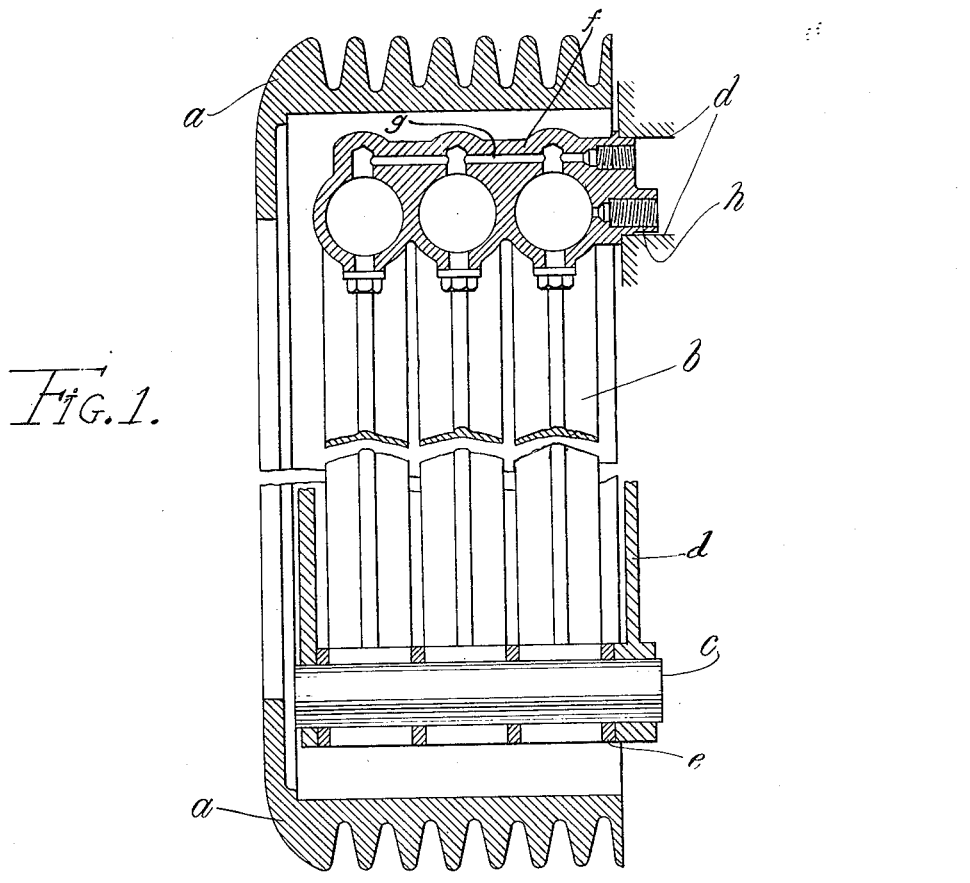
Figure 2:
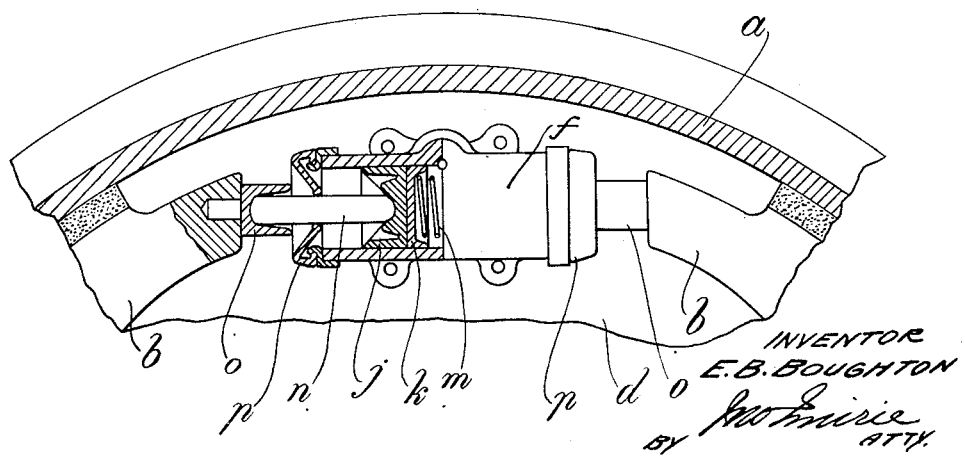

A brake of the internal expanding shoe type according to one form of the invention is illustrated in the accompanying diagrammatic drawing, of which Figure 1 is a transverse sectional elevation showing the disposition of the brake shoes within a single brake drum, parts being broken away for the sake of clearness, and Figure 2 is a fragmentary partly sectional side elevation showing the arrangement of one hydraulic cylinder and the corresponding pair of shoes.

As shown, there are provided within a single brake drum $a$ three pairs of brake shoes $b$ adapted to be rocked about a spindle $c$ carried by the usual stationary brake plate $d$ portions only of which are illustrated. The brake shoes $b$ are spaced apart by distant pieces or washers $e$ the spacing being effected at their upper ends by the operating mechanism which comprises three integrally-cast cylinders indicated at $f$ interconnected by a fluid passage $g$ and having a common inlet and outlet port $h$ for pressure fluid and three pairs of oppositely acting pistons and corresponding cup washers and pistons rods, one pair of pistons being arranged within each of the respective cylinders and their associated cup washers being held in position by means of a coiled spring as clearly shown in Figure 2 in which a piston is indicated at $j$, a cup washer at $k$, a coiled spring at $m$ and a piston rod at $n$. The outer end of each piston rod $n$ engages in a recessed thrust member $o$ mounted at the end of the corresponding brake shoe $b$ and a flexible cap $p$ serve to close the end of the cylinder.

The common inlet and outlet port $h$ is connected with any suitable or convenient source of hydraulic pressure (not illustrated in the drawing) so that each of the six pistons $j$ will, during the application of the brake, be subjected to the same pressure although each of said pistons $j$ will be free to move the corresponding brake shoe $b$ so that the latter will be brought into effective engagement with, exert its full share of pressure upon, the surface of the brake drum $a$.

It will be apparent that even if the brake drum $b$ becomes belled-out or distorted as the result of wear or other causes the braking pressure will yet be distributed uniformly over the active surface of the drum $b$.

What I claim is:—

1. A brake, comprising in combination a drum, a plurality of braking elements associated with the drum, said elements including pairs of brake shoes relatively spaced axially of the drum, a rigidly mounted casting formed with cylindrical bores in alignment with the ends of the braking elements, and pistons and rods mounted in the bores to act on the braking elements, the casting having inlet and outlet ports common to all the bores for admission and exhaustion of fluid pressure.

2. A brake mechanism for a vehicle wheel comprising a single drum, a plurality of brake elements of equal diameters disposed in relatively spaced, side by side relationship, each of said brake elements being coaxial with the drum, brake anchor means for said elements, a single liquid pressure means carried by the brake anchor means, a single hydraulic lead to said liquid pressure means, and means connecting the fluid pressure means with the brake elements individually and independently of one another.

3. A brake mechanism for a vehicle wheel comprising a single drum, a plurality of brake elements of equal diameters disposed in relatively spaced, side by side relationship and each coaxial of the drum, brake anchor means for said elements, a single liquid pressure unit having cylinders corresponding in number to the brake elements and carried by the brake anchor means, a single hydraulic lead to said liquid pressure means and communicating with all the cylinders thereof, pistons for each cylinder of the fluid pressure means, and mechanical coupling means corresponding in number with the brake elements and each connecting a brake element with a piston in a cylinder of the common fluid pressure means.

In testimony whereof I have hereunto signed my name.

EDWARD BISHOP BOUGHTON.